(12) United States Patent
Barquant et al.

(10) Patent No.: US 10,131,741 B2
(45) Date of Patent: Nov. 20, 2018

(54) BIOSOURCED ALKYD RESIN AND METHOD FOR MANUFACTURING SUCH AN ALKYD RESIN

(71) Applicants: A ET A MADER, Lille (FR); ROQUETTE FRERES, Lestrem (FR)

(72) Inventors: Cyril Barquant, Carpentras (FR); Joël Roussel, Morieres les Avignon (FR); Clothilde Buffe, Lomme (FR); Laura Crowther-Alwyn, Grenoble (FR)

(73) Assignees: A Et A Mader, Lille (FR); Roquette Freres, Lestrem (FR)

( * ) Notice: Subject to any disclaimer, the term of this patent is extended or adjusted under 35 U.S.C. 154(b) by 0 days.

(21) Appl. No.: 14/910,007

(22) PCT Filed: Aug. 5, 2014

(86) PCT No.: PCT/FR2014/052037
§ 371 (c)(1),
(2) Date: Feb. 4, 2016

(87) PCT Pub. No.: WO2015/019020
PCT Pub. Date: Feb. 12, 2015

(65) Prior Publication Data
US 2016/0168318 A1    Jun. 16, 2016

(30) Foreign Application Priority Data
Aug. 5, 2013    (FR) ...................................... 13 57761

(51) Int. Cl.
C08G 63/672    (2006.01)
C08G 63/48     (2006.01)
C09D 167/08    (2006.01)

(52) U.S. Cl.
CPC ........... *C08G 63/672* (2013.01); *C08G 63/48* (2013.01); *C09D 167/08* (2013.01)

(58) Field of Classification Search
CPC .................................................. C08G 63/672
See application file for complete search history.

(56) References Cited

U.S. PATENT DOCUMENTS

| 9,321,883 B2 * | 4/2016 | Roussel ................... C09D 5/02 |
| 2007/0179277 A1 | 8/2007 | Dallavia |
| 2011/0281972 A1 | 11/2011 | Beccaria |
| 2013/0197152 A1 * | 8/2013 | Herve et al. |

FOREIGN PATENT DOCUMENTS

| CA | 2175534 A1 | 11/1996 |
| WO | 19990038926 A1 | 8/1999 |
| WO | 20110051612 A1 | 10/2010 |
| WO | 20120005645 A1 | 1/2012 |

OTHER PUBLICATIONS

Aroma Web. "Essential Oils Directory: Essential Oil Properties, Uses and Benefits." ©2016. Available from: < http://www.aromaweb.com/essentialoils/default.asp >.*

* cited by examiner

*Primary Examiner* — Andrew D Kosar
*Assistant Examiner* — John S Kenyon
(74) *Attorney, Agent, or Firm* — Bookoff McAndrews, PLLC

(57) ABSTRACT

The present invention relates to an alkyd resin as well as to a method for preparing such a resin, said alkyd resin resulting from the polycondensation:
- of at least one polyacid, preferably biosourced, or its acid anhydride preferably biosourced,
- of at least one component based on oil, preferably biosourced, or its corresponding fatty acid, preferably biosourced,
- of at least one polyol, preferably biosourced, having at least two hydroxyl groups, selected from polyols comprising at least one 1,4:3,6-dianhydrohexitol unit,
- of rosin or of at least one of its derivatives,
- wherein at least one polyacid is succinic acid, preferably biosourced, or its anhydride, preferably biosourced;
- and wherein the percentage by dry weight of rosin or its derivatives based on the total dry weight of succinic acid and of its anhydride and of rosin or its derivatives is comprised between about 10% and about 80%.

23 Claims, No Drawings

BIOSOURCED ALKYD RESIN AND METHOD FOR MANUFACTURING SUCH AN ALKYD RESIN

The present invention generally relates to alkyd resins as well as to methods for manufacturing such resins. The present invention also relates to the formulation of such resins as aqueous emulsions, compositions or paint formulations.

Alkyd resins are resins of the polyester type generally derived from polycondensation between a polyacid and a polyol in the presence of oils or fatty acids with more or less long chains. These resins are mainly used as a binder in the field of coatings, in particular the field of coatings for adhesives, paints, wood stains, primary coats or varnish.

Conventional alkyd resins are formulated by means of volatile organic solvents of fossil origin and harmful for humans and/or the environment (such as white spirit, xylene, naphtha solvent). Alkyd resins are further synthesized from raw materials of fossil origin, i.e. stemming from the petrochemical or carbochemical industry, in particular from organic acids derived from petroleum (notably based on phthalic acid).

There thus exists a constant need for reducing, or even suppressing harmful compounds for humans and/or the environment used in the synthesis of these alkyd resins and in the aqueous emulsions comprising such resins, notably when they are used for paint formulations intended for the general public, while meeting the set specification requirements, both as regards emulsifying the alkyd resin in order to manufacture a paint with the same name, but also at application properties of the resulting paint film.

A certain number of solutions relative to alkyd resins having components of natural origin are already known, also known under the name of "biosourced components".

However, such resins have limited performances, notably in terms of hardening and of finishing quality of the corresponding films.

In this respect, document US 2011/0281972 describes a composition for obtaining a polyester resin intended to be applied by electrostatic dusting and notably containing isosorbide in combination with adipic acid.

PCT patent application no. WO 2012/005645 relates to an alkyd resin obtained by subjecting to one or several esterification or trans-esterification reactions, a composition comprising at least one polycarboxylic acid, at least one polyol and at least one monocarboxylic acid or its corresponding triglyceride.

PCT patent application no. WO 2011/051612, as for it, describes an alkyd resin at least partly prepared from biosourced components and the aqueous emulsification of such a resin with an emulsifier of natural or fossil origin.

Document WO 2012/042153 which relates to an alkyd resin based on at least one fatty acid and on rosin which may contain succinic, sebacic or itaconic acids is also known.

Working on the search for a performing alkyd resin in terms of hardness and gloss of paints in which it is incorporated, and notably produced at least partly from biosourced raw materials, the Applicant managed to develop such a formulation.

In this case, this solution consists of an alkyd resin derived from the polycondensation:
- of at least one polyacid, preferably biosourced, or its acid anhydride preferably biosourced;
- of at least one component based on oil, preferably biosourced, or its corresponding fatty acid, preferably biosourced;
- of at least one polyol, preferably biosourced, having at least two hydroxyl groups selected from polyols comprising at least one 1,4:3,6-dianhydrohexitol unit;
- of rosin or of one of its derivatives;

wherein at least one polyacid is succinic acid, preferably biosourced, or its anhydride, preferably biosourced;

and wherein the percentage by dry weight of rosin or its derivatives based on the total dry weight of succinic acid or of its anhydride and of rosin or its derivatives is comprised between about 10% and about 80%, preferably between about 30% and about 70%, preferably between about 50% and 65% and still preferably between about 60% and about 65%.

By alkyd resin in the present text is meant a modified polyester with oils and/or fatty acids. By biosourced in the present text, is meant any component of plant or animal origin.

In a completely unexpected way, the selection of the particular pair, succinic acid/rosin, in the percentages indicated above, gave the possibility of developing an alkyd resin having a viscosity quite compatible with its aqueous emulsification, which notably makes possible the formulation of an alkyd paint, the application properties, the hardness and the gloss of the final film of which are remarkable.

The polyacid as used in the invention, necessarily comprising succinic acid, represents between about 10% and 30%, preferably from 15% to 25% by weight based on the total amount by weight of alkyd resin; said polyacid component may, in addition to succinic acid, also include another polyacid; preferably, succinic acid is the sole polyacid constituent. Within the scope of the present invention, by polyacid is meant any component having at least two carboxyl groups (—COOH), advantageously 2 or 3 carboxyl groups (—COOH), in particular 2 carboxyl groups (—COOH).

In the case when another polyacid is present, the amount by weight of succinic acid or of its anhydride based on the total amount by weight of polyacid is comprised between about 10% and about 50%, preferably between about 10% and about 40%.

In the case when another polyacid is present, the latter may be selected from aromatic polyacids, cycloalkyl polyacids or acid anhydrides of said polyacids.

Advantageously, the alkyd resin according to the invention comprises less than 10% by moles, still preferably less than 5% by moles of aromatic polyacid, of cycloalkyl polyacid or of an acid anhydride of said polyacids other than rosin. The alkyd resin according to the invention is optionally free of aromatic polyacid, of cycloalkyl polyacid or acid anhydride of the latter other than rosin.

In an alternative, the polyacid component is saturated or unsaturated and includes a hydrocarbon chain having a minimum of 2 carbon atoms and a maximum of 36 carbon atoms. A saturated hydrocarbon chain is formed by carbon and hydrogen atoms bound to each other in order to form so called methylene groups —$CH_2$—. Preferably, the fatty acid(s) include(s) between 12 and 24 carbon atoms.

Advantageously, an aromatic polyacid according to the invention is a compound comprising at least two carboxyl groups and an aromatic hydrocarbon ring, said ring comprising from 3 to 13 atoms, preferably from 3 to 10 atoms and still preferably from 3 to 6 atoms, in particular of carbon and optionally one or several heteroatoms, in particular selected from O, S and N. The aromatic ring may thus be a benzene, furane, pyrrole, thiophene or further naphthalene ring.

Advantageously, a cycloalkyl polyacid according to the invention is a compound comprising at least two carboxyl groups and a saturated hydrocarbon ring notably comprising from 3 to 10 carbon atoms, preferably from 3 to 6 carbon atoms, such as cyclopropyl or cyclohexyl.

In an embodiment, the polyacid component or its acid anhydride, in addition to succinic acid, is selected alone or as a combination from among adipic acid ($C_6H_{10}O_4$), itaconic acid ($C_5H_6O_4$), azelaic acid, sebacic acid, tartaric acid, citric acid, malic acid and/or their respective acid anhydride, oligomers of a fatty acid of plant and/or animal origin, in particular dimers or trimers of a fatty acid of plant and/or animal origin such as PRIPOL™ 1012 or 1013 marketed by CRODA.

As for the component based on oil or on its corresponding fatty acid, they are preferably biosourced. The resin according to the present invention comprises between 10% and 50%, preferably between 25% and 35% by weight of said component. The latter may be selected from among siccative and/or semi-siccative plant and/or animal oils and fatty acids entering the composition of said plant and/or animal oils.

From among synthetic (i.e. non biosourced) fatty acids which may also be used as a starting product for alkyd resins according to the invention, mention may be for example made of versatic, butanoic and octanoic acids.

Let us recall that a fatty acid (RCOOH) is a carboxylic acid, either saturated or not, generally obtained by hydrolysis of fats (notably long chain carboxylic acid esters or glycerides), wherein R is a saturated alkyl chain ($C_nH_{2n+1}$) or an unsaturated alkenyl chain ($C_nH_{2n-1}$). Preferably, the fatty acids according to the invention may be introduced as such or as refined monoglyceride(s) or refined mixture(s) of mono- and/or di- and/or tri-glycerides, in other words as plant and/or animal oil(s). The hydrolysis of one mole of mono-, di- or tri-glyceride in a basic medium respectively allows the formation of one mole, two moles or three moles of biosourced fatty acid according to the invention.

By dryness of an oil is understood its capability of drying in the presence of oxygen of air, this capability increases with the increase in the number of unsaturations (or doubles bonds) present in the structure of the oil. One thus refers to a siccative oil if the iodine number is greater than 150, semi-siccative if the iodine number is comprised between 110 and 150 inclusive, and non-siccative if the iodine number is less than 110. The iodine number "Ii" corresponds to the halogen mass expressed in grams and bound on the double bonds present in the structure of the oil.

In an alternative, the plant oils and their corresponding fatty acids are selected from soya oils or fatty acids, sunflower oils or fatty acids, flax oils or fatty acids, tung oils or fatty acids, castor oils or fatty acids, tall-oil fatty acid and/or mixtures thereof, preferably from among the aforementioned fatty acids, advantageously soya or flax oil or soya or flax fatty acids still more advantageously fatty acids of soya or flax oil, and still more advantageously fatty acids of soya oil, in particular those having a high oleic acid content (advantageously between 24 and 34% by weight) such as the soya fatty acid marketed by OLEON under reference NOURACID® SZ35.

Advantageously, the fatty acids of soya oil comprise acids selected from among oleic acid (advantageously between 20% and 30% by weight), linoleic acid (advantageously between 40% and 70% by weight), α-linolenic acid (advantageously between 2% and 13%), palmitic acid (advantageously between 7% and 18%), stearic acid (preferably between 1% and 8%) and saturated fatty acids (advantageously between 0.1% and 2% by weight).

Advantageously, the fatty acids of flax oil comprise acids selected from among α-linolenic acid (advantageously between 45 and 70% by weight), linoleic acid (advantageously between 12% and 24%), oleic acid (advantageously between 10% and 21% by weight), and saturated fatty acids (advantageously between 6% and 18%).

As regards the polyol, the resin according to the present invention comprises between about 20% and about 30% by weight of said polyol component based on the total amount by weight of the alkyd resin. Here this is the weight proportion of the polyol(s) each comprising at least two hydroxyl groups based on the total weight of the whole of the starting compounds for synthesizing the alkyd resin. The latter is selected from pentaerythritol ($C_5H_{12}O_4$), glycerol ($C_3H_8O_3$), sorbitol ($C_6H_{14}O_6$), erythritol ($C_4H_{10}O_4$), and preferably pentaerythritol and glycerol, and/or selected from among the polyols comprising at least one 1,4:3,6-dianhydrohexitol unit, and preferably from among 1,4:3,6-dianhydro-D-sorbitol (isosorbide), 1,4:3,6-dianhydro-D-mannitol (isomannide), and 1,4:3,6-dianhydro-L-iditol (isoidide), and still preferably isosorbide, each of these polyols being taken alone or as a combination with at least one other.

Preferably, when the polyol comprises at least one polyol comprising at least one 1,4:3,6-dianhydrohexitol unit, it also comprises a polyol selected from among pentaerythritol ($C_5H_{12}O_4$), glycerol ($C_3H_8O_3$), sorbitol ($C_6H_{14}O_6$), erythritol ($C_4H_{10}O_4$), and preferably pentaerythritol and glycerol.

Preferably, the polyol is of a biosourced origin and may be selected from among sorbitol and glycerol.

In an alternative, the resin according to the present invention comprises between about 10% and about 25% by weight, preferably between about 10% and about 20% by weight, of said at least one polyol comprising at least one 1,4:3,6-dianhydrohexitol unit based on the total amount by weight of the alkyd resin.

As regards the rosin derivatives, are also meant natural derivatives such as notably abietic acid or dehydroabietic acid.

In an alternative, the alkyd resin has an acid number of less than 20 mg KOH/g, preferably less than or equal to 15 mg KOH/g. Preferably, the acid number is greater than 5 mg KOH/g. In particular it is comprised between 6 and 13 mg KOH/g. By acid number is meant, in the sense of the present invention, an index characterizing the acidity of the alkyd resin. This number thus corresponds to the number of milligrams of potassium hydroxide required for neutralizing 1 gram of alkyd resin sample.

In an alternative, the alkyd resin has an oil length comprised between 10% and 50%, preferably between 20% and 40%, in particular between 25% and 35%. By oil length, in the sense of the present invention is meant the oil or fatty acid content, i.e. the fatty acid mass based on the mass of all the constituents of the alkyd resin after removing the esterification water.

The alkyd resins according to the invention have a glassy transition initial temperature ("Tg") (i.e. before cross-linking) generally comprised between about −30° C. and about −60° C., as well as a final glassy transition temperature (i.e. after cross-linking) generally comprised between about 40° C. and about 60° C.

A particularly preferred resin of the invention results from the reaction between:
 a soya fatty acid, preferably a soya fatty acid marketed under the name of Nouracid® SZ35 in an amount ranging from about 10% to about 50% by weight, preferably between about 25% and about 35%, still preferably comprised between about 25% and about 30%, or about 28% by weight of soya fatty acid based on the total amount of resin by weight, an isosorbide, preferably an isosorbide marketed under the name of Polysorb® P in an amount ranging from about 10% to about 20%, preferably about 13% to about 17%, still preferably about 15% by weight of isosorbide based on the total amount of resin by weight, a succinic acid, preferably the succinic acid marketed by Reverdia, in an amount ranging from about 10% to about 30%, preferably from about 15% to 25%, still preferably from about 15% to 20% by weight based on the total amount of resin by weight, glycerol or one of its derivatives, preferably glycerol (or propane-1,2,3-triol), in an amount ranging from about 5% to about 15%, preferably about 9% by weight of glycerol based on the total amount of resin by weight, and a rosin, preferably a Portuguese gem rosin in an amount comprised between about 20% and about 40%, preferably about 30% based on the total amount of resin by weight, applied at a temperature of at least about 230° C., preferably about 240° C., still preferably 250° C., for at least 3 hours, preferably at least 6 hours, and still preferably until an acid number is attained of less than 15 mg KOH/gram of resin.

A particularly preferred resin of the invention has the following characteristics:

an acid number at least greater than about 5 mg KOH/g, preferably about 9.1 mg KOH/g (ISO 3682);

a Noury viscosity at 20° C., after dilution to 70% of the dry extract in a solvent such as for example white spirit, comprised between about 20 and about 100 poise (or also seconds noted as "s"), still preferably about 21.4 poise (ISO 3219:1993);

an oil length comprised between about 20% and about 40%, preferably about 31%.

A method allowing identification whether a polyacid, a polyol or a fatty acid is biosourced, consists of identifying whether this component comprises $^{14}C$ carbon, synonymous with the presence of renewable carbon. Indeed, a biosourced component is a component for which the carbon stems from recently bound $CO_2$ (on a human scale) by photosynthesis from the atmosphere. On earth, this $CO_2$ is captured and bound by plants. In the sea, this $CO_2$ is captured and bound by bacteria or plankton proceeding with photosynthesis. The $^{14}C$ carbon content of a biosourced component is determined by applying the ASTM D 6866 (ASTM D 6866-06) and ASTM D 7026 (ASTM D 7026-04) standard, preferentially according to the mass spectrometry measurement method described in the ASTM D6866-06 standard ("accelerator mass spectroscopy").

Within the scope of the present invention, by biosourced component is meant any compound comprising at least 1% by weight of renewable carbon, advantageously at least 50%, preferentially at least 90% of renewable carbon. This definition also applies to the biosourced reactive dilutant or to the emulsifiers of the alkyd resin mentioned below.

In an alternative, the resin of the invention is exclusively synthesized from biosourced compounds (notably, polyacids, polyols and oils).

The object of the present invention according to another aspect, is a method for preparing an alkyd resin, such as the one described according to one of the alternative embodiments mentioned above, comprising a step for polycondensation of the following components:

at least one polyacid, preferably biosourced, or its acid anhydride preferably biosourced;

at least one component based on oil, preferably biosourced, or its corresponding fatty acid, preferably biosourced;

at least one polyol, preferably biosourced, having at least two hydroxyl groups selected from among the polyols comprising at least one 1,4:3,6-dianhydrohexitol unit;

rosin or one of its derivatives;

and wherein these components being dynamically mixed continuously at a temperature comprised between 180° C. and 280° C., preferably between 220° C. and 280° C., until formation of the alkyd resin.

Preferably, said at least one polyacid is succinic acid, preferably biosourced, or its anhydride, preferably biosourced and the percentage by dry weight of rosin or its derivatives based on the total dry weight of succinic acid or of its anhydride and of rosin or its derivatives is comprised between about 10% and about 80%, preferably between about 30% and about 70%, still preferably between about 50% and 65%.

It is advantageous if during the polycondensation step (essentially by esterification or trans-esterification) of the starting components, the effective functionality of the reaction medium is controlled and remains preferentially less than 2 in order to avoid a risk of gelling of said medium. By effective functionality of a component, in the sense of the present invention, is meant the number of reactive groups present per molecule of this compound (in particular the number of hydroxyl and/or carboxyl groups). By effective functionality of an alkyd resin, in the sense of the present invention is meant the average effective functionality of the reaction mixture formed by the starting components: F=total number of functional groups used/total number of molecules.

The proportions of the various starting components correspondent to those indicated above for the alkyd resin.

In an alternative, the polycondensation step is carried out without any catalyst of the esterification reaction. This arrangement avoids the use of a catalyst and notably its recycling. Nevertheless, it is customary for the person skilled in the art to use a polycondensation catalyst such as calcium hydroxide $[Ca(OH)_2]$ or lithium hydroxide $[Li(OH)]$, in order to accelerate the polycondensation reaction.

In an alternative, the polycondensation step is carried out, for example in a merging mode without any solvent or, in an azeotropic mode with a solvent, notably xylene, in order to produce azeotropy.

The azeotropic mode is mainly used for synthesizing alkyd resins. It is based on the formation of the water-solvent, notably water-xylene azeotrope. As soon as the water molecules are formed, they form an azeotrope with the solvent, notably xylene, which is transformed into steam and is carried away towards the condenser. The vapours are then condensed by the condenser. It is possible to recover the water at the bottom of the circuit, the latter being more dense than the solvent, notably xylene. The solvent which was used for producing azeotropy is removed at the end of the synthesis by a distillation operation, notably the evaporation of the solvent under reduced pressure.

The merging mode may also be highly advantageously used, this circuit being moreover used for synthesizing (un)saturated polyester resins. This synthesis mode is well known to the person skilled in the art and is very widely described in the relevant technical literature. Preferably, a packed column is integrated between the flask and the Dean Stark. In the column, the glycols evaporate at the same time as the water but they re-condense faster and fall back into the flask since their boiling temperature is higher than that of water. Water as for it re-condenses and falls back into the Dean Stark. It is thus removed from the flask.

In an alternative, the temperature of the reaction medium during the polycondensation step is gradually raised up to at least 180° C., preferably at least 220° C., under a flow of chemically inert gas, in particular nitrogen.

In an alternative, the temperature of the reaction medium during the polycondensation step is maintained for at least two hours between 220° C. and 250° C., at least three hours, preferably six hours, at at least about 180° C., preferably at least about 200° C., preferably at least about 220° C., and still preferably at least about 240° C. or at least about 250° C., until an acid number is attained of less than about 20 mg KOH/g of alkyd resin.

In an another alternative, the temperature of the reaction medium is comprised between about 180° C. and about 280° C., preferably between about 200° C. and about 280° C., preferably between about 220° C. and about 280° C., still preferably between about 240° C. and about 280° C.

In an alternative, at the end of the polycondensation step, the solvent is removed, notably by distillation under reduced pressure, until the alkyd resin formed has a dry extract at least equal to 97%, preferably greater than or equal to 99% by mass.

The object of the present invention according to another aspect is an alkyd resin derived from polycondensation:
  of at least one polyacid, preferably biosourced, or its acid anhydride preferably biosourced,
  of at least one component based on oil, preferably biosourced, or its corresponding fatty acid, preferably biosourced,
  of at least one polyol, preferably biosourced, having at least two hydroxyl groups, selected from polyols comprising at least one 1,4:3,6-dianhydrohexitol unit;
  of rosin or of at least one of its derivatives,
  wherein at least one polyacid is succinic acid, preferably biosourced, oritsanhydride, preferably biosourced;
  wherein the percentage by dry weight of rosin or of its derivatives relatively to the total dry weight of succinic acid or of its anhydride and of rosin or its derivatives is comprised between about 10% and about 80%, preferably between about 30% and about 70%, preferably between about 50% and 65% and still preferably between about 60% and about 65%; which may be obtained by a method according to the invention.

In an alternative, the percentage by dry weight of rosin or of one of its derivatives relatively to the total dry weight of succinic acid or of its anhydride and of rosin or of one of its derivatives is comprised between about 50% and 65%, preferably between about 60% and about 65%, and the temperature of the reaction medium during the polycondensation step is maintained for at least two hours, at at least about 220° C., preferably at least 240° C., still preferably about 240° C. or about 250° C.

The alkyd resins according to the invention may notably be used for manufacturing a composition comprising an alkyd resin according to one of the alternative embodiments described above, and a reactive diluent, preferably biosourced.

The alkyd resins according to the invention may notably be used for manufacturing an aqueous emulsion of an alkyd resin comprising from 25% to 60%, advantageously 30% to 50%, by weight of alkyd resin based on the total amount by weight of the emulsion obtained according to one of the alternative embodiments described above, or of the resin described above, and at least one emulsifying agent, preferably of plant or animal origin, preferably in an amount ranging from 0.1% to 7%, advantageously from 0.3 to 1% by weight of the aqueous emulsion. The values (%) by weight indicated hereafter are given based on the total weight of the aqueous emulsion.

In an alternative, the emulsifier may be ionic or non-ionic, and is preferably selected alone or as a combination from among: alkyl sulfonates, aryl sulfonates, stearates, lecithin, glycerol monoesters, fatty acid monoesters either ethoxylated or not, surfactants having a double bond, polymeric surfactants, pentaerythritol esters, sorbitan esters, such as sorbitan monooleate or sorbitan monolaurate, advantageously this is a sorbitan ester, in particular sorbitan monolaurate.

In an alternative, the aqueous emulsion comprises at least one anti-foam agent, preferably in an amount ranging from 0.1% to 2% by weight of said aqueous emulsion, in particular from 0.2% to 1.5% by weight. In a sub-alternative, the anti-foam agent is selected alone or as a combination from among: polysiloxanes, fatty acid and polyoxyethylene esters, fatty acid and polyoxypropylene esters, sorbitan and polyoxyethylene esters such as polyoxyethylene sorbitan monolaurate, advantageously this is a sorbitan and polyoxyethylene ester.

In an alternative, the aqueous emulsion comprises at least one stabilizer, preferably in a proportion ranging from 0.1% to 8% by weight of said emulsion, advantageously from 0.2% to 5% by weight. In a sub-alternative, the stabilizer is selected alone or as a combination from among: modified starches, xanthan gums, guar gums, modified celluloses, advantageously these are modified starches such as TACKIDEX® 110UY.

In an alternative, the aqueous emulsion comprises at least one polyfunctional agent having a function of an anti-foam agent and/or of an emulsifier and/or of a stabilizer, preferably in an amount ranging from 0.5% to 8% by weight of said emulsion. In a sub-alternative, the polyfunctional agent is selected, alone or as a combination, from among: β-cyclodextrins, gum arabic, plant and animal proteins, notably casein and/or gelatin.

Alkyd resins may be emulsified with water in order to form an oil-in-water emulsion. In order to form this emulsion, it is possible to mix the alkyd resin with water and the various aforementioned agents in order to form an emulsion. There exist several devices capable of producing an emulsion; from the stirrer to the high pressure homogenizer while passing through the colloidal milling machine and the turbo emulsifier, all well known to the person skilled in the art.

These emulsions may be manufactured by any method well known to the person skilled in the art. Notably, by means of a method comprising a step for mixing an oil phase comprising the alkyd resin according to the invention and an aqueous phase.

A method may be carried out in which one passes through a water-in-oil emulsion as described in application WO 2011/051612. These alkyd resins, made sufficiently fluid by conventional heating to 80° C., are then dispersed in water so as to form an emulsion of the water-in-oil type (W/O). This W/O emulsion will be reversed by adding water so as to form an emulsion of the oil-in-water (0/W) emulsion.

Alternatively, it is possible to carry out a method for making the emulsion with a step for directly emulsifying the oil phase in the water phase. This method is made possible by the excellent rheological behaviour of the alkyd resin according to the invention.

More particularly, it is possible to directly make an oil-in-water (0/W) emulsion by applying the following steps:

a first step during which, said alkyd resin is heated to a temperature greater than or equal to 40° C., preferably less than or equal to 90° C. in order to form a mixture A, with stirring, notably by means of a mixing device having a stirring blade rotating at a speed of rotation comprised between 2,000 rpm and 8,000 rpm, optionally with an emulsifier;

a second step during which, a stabilizer is mixed with water, and optionally with an anti-foam agent, by heating to a temperature greater than or equal to 40° C., preferably less than or equal to 90° C. in order to form a mixture B;

a third step during which said mixture A is incorporated into said mixture B, with intense stirring, notably by means of a device including a stirring blade rotating between 5,000 rpm and 8,000 rpm, preferably the temperature of the A and B mixtures is less than or equal to 60° C., for at least one minute in order to obtain the emulsion of said alkyd resin.

The thereby formed emulsions preferentially have a viscosity ranging from 1,000 cP (or 1,000 mPa·s) to 2,000 centipoise (or 2,000 mPa·s) at 20° C., measured according to the ISO 3219: 1993 standard.

The object of the present invention according to another aspect is a paint comprising at least one alkyd resin according to the invention, preferably as an aqueous emulsion as defined above.

The formulation of paint may also comprise in a well-known way to the person skilled in the art, additional agents, notably one or several pigments, such as natural pigments (biosourced): titanium dioxide, iron oxides, carbon black, weld yellow, pastel blue and red madder; or further synthetic pigments stemming from a fossil source: phthalocyanin blue and green, azoic yellow and quinacridone red.

The paint formulation may also comprise fillers, such as calcium carbonates, talcum or silica, beeswax or carnauba wax.

Other applications in which the alkyd resins of the invention may be used are also contemplated. Mention may notably be made as an example, of fields for application of adhesives, coatings (such as decorative and industrial paints, lacquers, varnishes and wood stains) or else further plasticizers.

The paint formulation of the invention may also contain a siccative or semi-siccative agent.

It is possible to obtain the paint formulation of the invention by mixing the aqueous emulsion with the additional agents mentioned earlier and optionally water. The amounts of fillers and/or pigments are determined according to the desired properties (such as for example wettability or surface tension) for said formulation.

The present invention will be better understood upon reading the following exemplary embodiments, mentioned in a non-limiting way.

EXAMPLES PRODUCED

In this example, 7 alkyd resins were produced:
2 applying an adipic acid/rosin pair (examples 1 and 5);
1 applying adipic acid without rosin (example 3);
4 according to the invention, applying a succinic acid/rosin pair, with 46% by weight of rosin par relatively to the acid (example 2) and with 63% by weight of rosin relatively to the acid.

These resins were then diluted, and then put into an aqueous emulsion, and finally they were used for formulating paints for which the gloss and the hardness was determined.

Synthesized Alkyd Resins

Comparative Example 1

This example applies 41% by weight of rosin based on the total weight of rosin and adipic acid.

In a 2-liter reactor equipped with a mechanical stirrer, with a temperature probe, with a nitrogen inflow, with a sample socket, a packed column surmounted with a decanter and a condenser, at room temperature were introduced:
192.1 g of soja fatty acid (Nouracid® SZ35 marketed by Brenntag);
103.4 g of Portuguese gem rosin (marketed by Resineland);
100 g of isosorbide (Polysorb® P marketed by Roquette);
150 g of adipic acid
63 g of glycerol.

The temperature of the reaction medium was then gradually raised up to 220° C. under nitrogen flow. The condensation water was removed gradually until an acid number of less than 15 mg KOH/gram of resin was obtained. At the end of the reaction, an alkyd resin appearing as a viscous liquid was obtained. The characteristics of the alkyd resin obtained are:
an acid number of 7.3 mg KOH/g (ISO 3682);
a dry extract of 69.89% (ISO 3251);
a Noury viscosity of 16.2 s at 20° C. (viscosity observed according to the procedure described in the ISO 3219: 1993 standard; this viscosity is that of the alkyd resin obtained according to the method described above after diluting the resin to 70% in white spirit);
an oil length of 35%;

Comparative Example 2

This example does not apply rosin.

In a 2-liter reactor equipped with a mechanical stirrer, a temperature probe, a nitrogen supply, a sample socket, a packed column surmounted with a decanter and a condenser, at room temperature were introduced:
358.6 g of soya fatty acid (Nouracid® SZ35);
93.3 g of isosorbide (Polysorb® P);
140 g of adipic acid;
86.9 g of pentaerythritol;
27.2 g of xylene.

The temperature of the reaction medium was then gradually raised up to 220° C. under nitrogen flow. The condensation water was gradually removed until an acid number of less than 15 mg KOH/gram of resin was obtained. At the end of reaction, an alkyd resin appearing as a viscous liquid was obtained. The characteristics of the alkyd resin obtained are:
an acid number of 10.5 mg KOH/g (ISO 3682);
a dry extract of 99% (ISO 3251);
a viscosity of 340 poise at 20° C. (ISO 3219:1993);
an oil length of 58%.

Comparative Example 3

This example applies 58% by weight of rosin based on the total weight of rosin and of adipic acid.

In a 2-liter reactor equipped with a mechanical stirrer, a temperature probe, a nitrogen supply, a sampling socket, a packed column surmounted with a decanter and a condenser, at room temperature, were introduced:
- 172.9 g of soya fatty acid (Nouracid® SZ35);
- 186.2 g of Portuguese gem rosin;
- 90 g of isosorbide (Polysorb® P);
- 135 g of adipic acid;
- 56.7 g of glycerol.

The temperature of the reaction medium was then gradually raised up to 220° C. under nitrogen flow. The condensation water was removed gradually until an acid number of less than 20 mg KOH/gram of resin was obtained. At the end of the reaction, an alkyd resin appearing as a viscous liquid was obtained. The characteristics of the alkyd resin obtained are:
- an acid number of 16 mg KOH/g (ISO 3682);
- a 69.89% dry extract (ISO 3251);
- a Noury viscosity of 8.8 s at 20° C. (viscosity observed according to the procedure described in the ISO 3219: 1993 standard; this viscosity is that of the alkyd resin obtained according to the method described above after diluting the resin to 70% in white spirit);
- an oil length of 30%.

Example 1 According to the Invention

This example applies 46% by weight of rosin based on the total weight of rosin and succinic acid.

In a 2-liter reactor equipped with a mechanical stirrer, with a temperature probe, with a nitrogen supply, with a sampling socket, with a packed column surmounted with a decanter and a condenser, at room temperature, were introduced:
- 191.7 g of soya fatty acid (Nouracid® SZ35);
- 103.2 g of Portuguese gem rosin;
- 99.8 g of isosorbide (Polysorb® P);
- 121 g of succinic acid;
- 62.3 g of glycerol.

The temperature of the reaction medium was then gradually raised up to 250° C. under nitrogen flow. The condensation water was removed gradually until an acid number of less than 15 mg KOH/gram of resin was obtained. At the end of reaction, an alkyd resin appearing as a viscous liquid was obtained. The characteristics of the alkyd resin obtained are:
- an acid number of 8.2 mg KOH/g (ISO 3682);
- a 70.34% dry extract (ISO 3251);
- a Noury viscosity of 56 s at 20° C. (viscosity observed according to the procedure described in the ISO 3219: 1993 standard; this viscosity is that of the alkyd resin obtained according to the method described above after diluting the resin to 70% in white spirit);
- an oil length of 37%.

Example 2 According to the Invention

This example applies 63% by weight of rosin based on the total weight of rosin and succinic acid.

In a 2-liter reactor equipped with a mechanical stirrer, with a temperature probe, with a nitrogen supply, with a sampling socket, with a packed column surmounted with a decanter and a condenser, at room temperature, were introduced:
- 158.4 g of soya fatty acid (Nouracid® SZ35);
- 170.6 g of Portuguese gem rosin;
- 82.5 g of isosorbide (Polysorb® P);
- 100 g of succinic acid;
- 52 g of glycerol.

The temperature of the reaction medium was then gradually raised up to 250° C. under nitrogen flow. The condensation water was gradually removed until an acid number of less than 15 mg KOH/gram of resin was obtained. At the end of reaction, an alkyd resin appearing as a viscous liquid was obtained. The characteristics of the alkyd resin obtained are:
- an acid number of 9.1 mg KOH/g (ISO 3682);
- a 69.75% dry extract (ISO 3251);
- a Noury viscosity of 21.4 s at 20° C. (viscosity observed according to the procedure described in the ISO 3219: 1993 standard; this viscosity is that of the alkyd resin obtained according to the method described above after diluting the resin to 70% in white spirit);
- an oil length of 31%.

Example 3 According to the Invention

This example applies 63% by weight of rosin based on the total weight of rosin and of succinic acid.

In a 2-liter reactor equipped with a mechanical stirrer, with a temperature probe, with a nitrogen supply, with a sampling socket, with a packed column surmounted with a decanter and a condenser, at room temperature, were introduced:
- 140.6 g of soya fatty acid (Nouracid® SZ35);
- 302.9 g of Portuguese gem rosin;
- 146.4 g of isosorbide (Polysorb® P);
- 177.5 g of succinic acid;
- 52 g of glycerol.

The temperature of the reaction medium was then gradually raised up to 250° C. under nitrogen flow. The condensation water was removed gradually until an acid number of less than 15 mg KOH/gram of resin was obtained. At the end of the reaction, an alkyd resin appearing as a viscous liquid was obtained. The characteristics of the alkyd resin obtained are:
- an acid number of 13.2 mg KOH/g (ISO 3682);
- a 69.55% dry extract (ISO 3251);
- a Noury viscosity 480 s at 20° C. (viscosity observed according to the procedure described in the ISO 3219: 1993 standard; this viscosity is that of the alkyd resin obtained according to the method described above after diluting the resin to 70% in white spirit).

Example 4 According to the Invention

This example applies 63% by weight of rosin based on the total weight of rosin and of succinic acid.

In a 2-liter reactor equipped with a mechanical stirrer, with a temperature probe, with a nitrogen supply, with a sampling socket, with a packed column surmounted with a decanter and a condenser, at room temperature, were introduced:
- 211 g of soya fatty acid (Nouracid® SZ35);
- 302.9 g of Portuguese gem rosin;
- 146.4 g of isosorbide (Polysorb® P);
- 177.5 g of succinic acid;
- 92.3 g of glycerol.

The temperature of the reaction medium was then gradually raised up to 250° C. under nitrogen flow. The condensation water was gradually removed until an acid number of less than 15 mg KOH/gram of resin was attained. At the end of reaction, an alkyd resin appearing as a viscous liquid was obtained. The characteristics of the non-diluted alkyd resin obtained are:
- an acid number of 10 mg KOH/g (ISO 3682);
- a 70.09% dry extract (ISO 3251);

a Noury viscosity 64.5 s at 20° C. (viscosity observed according to the procedure described in the ISO 3219: 1993 standard; this viscosity is that of the alkyd resin obtained according to the method described above after diluting the resin to 70% in white spirit).

Comparative Example 5

This example is identical with example 2 according to the invention, the only difference being the replacement of isosorbide with an equivalent molar amount of monopropylene glycol.

Produced Alkyd Paints

In a first phase, the alkyd resins were diluted in white spirit in order to attain a dry extract value of 70%±2%. They are then evaluated and compared with a Glycero resin from the market of petroleum-sourced origin: Synolac 6885 marketed by Arkema and having a dry extract of 70%±2%. Each resin was then formulated with the same additives and in the same proportions as indicated in Table 1.

TABLE 1

| Raw materials (% by weight of the total weight of the paint) | Control paint (Synolac 6865/Leader White Lacquer) | Alkyd paint according to the invention |
|---|---|---|
| White Spirit | 27.4% | 27.4% |
| Wetting agent | 0.45% | 0.45% |
| Thickener Disperbyk 116 | 0.5% | 0.5% |
| Titanium RDI-S (Kemira) | 30% | 30% |
| Calcium carbonate Mikhart 40 (La Provençale) | 7.3% | 7.3% |
| Anti-skin agent Troymax (Troy) | 0.3% | 0.3% |
| Siccative agent | 1.55% | 1.55% |

The results of the tests appear in Table 2.

Reading Table 2 demonstrates that the paints according to the invention give the possibility of obtaining a compromise at least equivalent to the one obtained for the commercial resin, at its hardness and at its gloss.

TABLE 2

| Characteristics | Synolac 6865 | Comp. Example 1 | Comp. Example 2 | Comp. Example 3 |
|---|---|---|---|---|
| Persoz hardness 7 days NF EN ISO 1522 | 62 s | 21 s | 53 s | 34 s |
| Persoz hardness 14 days NF EN ISO 1522 | | 25 s | 55 s | 42 s |
| Persoz hardness 21 days NF EN ISO 1522 | 80 s | 23 s | 57 s | 44 s |
| 60° gloss (7 days) NF EN ISO 2813 | 87% | 89% | 82% | 94% |
| 60° gloss (21 days) NF EN ISO 2813 | 84% | 85% | | 92% |

| Characteristics | Example 1 | Example 2 | Example 3 | Example 4 | Comp. Example 5 |
|---|---|---|---|---|---|
| Persoz hardness 7 days NF EN ISO 1522 | 50 s | 62 s | 87 s | 81 s | 30 s |
| Persoz hardness 14 days NF EN ISO 1522 | 68 s | 84 s | | | 32 s |
| Persoz hardness 21 days NF EN ISO 1522 | 66 s | 81 s | | | 34 s (16 days) |
| 60° gloss (7 days) NF EN ISO 2813 | 86% | 94% | 90% | 89% | |
| 60° gloss (21 days) NF EN ISO 2813 | 85% | 91% | | | |

The invention claimed is:

1. An alkyd resin resulting from the polycondensation:
   of at least one polyacid or acid anhydride thereof, wherein the at least one polyacid is chosen from succinic acid, adipic acid, itaconic acid, azelaic acid, sebacic acid, tartaric acid, citric acid, malic acid, or a combination thereof;
   of at least one oil or corresponding fatty acid, wherein the at least one oil is chosen from soya oil, sunflower oil, flax oil, tung oil, castor oil, tall oil, or a mixture thereof;
   of at least one polyol comprising at least one 1,4:3,6-dianhydrohexitol unit; and
   of a rosin or rosin derivative, wherein the rosin or rosin derivative is chosen from Portuguese gem rosin, abietic acid, or dehydroabietic acid;
   wherein the at least one polyacid comprises succinic acid or succinic acid anhydride;
   and wherein the percentage by dry weight of the rosin or rosin derivative based on the total dry weight of the succinic acid or succinic acid anhydride and the rosin or rosin derivative is between about 10% and about 80%.

2. The resin according to claim 1, wherein the resin comprises from 10% to 30% by weight of the at least one polyacid.

3. The resin according to claim 1, wherein the resin comprises between 10% and 50% by weight of the at least one oil or corresponding fatty acid.

4. The resin according to claim 1, wherein the resin further comprises pentaerythritol ($C_5H_{12}O_4$), glycerol ($C_3H_8O_3$), sorbitol ($C_6H_{14}O_6$), or erythritol ($C_4H_{10}O_4$).

5. The resin according to claim 1, wherein the at least one polyol comprises 1,4:3,6-dianhydro-D-sorbitol (isosorbide), 1,4:3,6-dianhydro-D-mannitol (isomannide), or 1,4:3,6-dianhydro-L-iditol (isoidide).

6. The resin according to claim 5, wherein the resin comprises from 20% to 30% by weight of the at least one polyol.

7. The resin according to claim 6, wherein the resin has an acid number of less than 20 mg KOH/g.

8. The resin according to claim 1, wherein the resin has an oil length between 10% and 50% by weight.

9. The resin according to claim 1, wherein the percentage by dry weight of the rosin or rosin derivative based on the total dry weight of the at least one polyacid or acid anhydride thereof and the rosin or rosin derivative is between about 30% and about 70%.

10. The resin according to claim 1, wherein the percentage by dry weight of the rosin or rosin derivative based on the total dry weight of the at least one polyacid or acid anhydride thereof and the rosin or rosin derivative is between about 50% and about 65%.

11. The resin according to claim 2, wherein the resin comprises from 15% to 25% by weight of the at least one polyacid.

12. The resin according to claim 3, wherein the resin comprises between 25% and 35% by weight of the at least one oil or corresponding fatty acid.

13. The resin according to claim 4, wherein the resin further comprises pentaerythritol or glycerol.

14. A method for preparing an alkyd resin according to claim 1, comprising a polycondensation step of the following components:
- the at least one polyacid or acid anhydride thereof;
- the at least one oil or corresponding fatty acid;
- the at least one polyol; and
- the rosin or rosin derivative;
- wherein the percentage by dry weight of the rosin or rosin derivative based on the total dry weight of succinic acid or succinic acid anhydride and the rosin or rosin derivative is between about 10% and about 80%;
- wherein the polycondensation step comprises continuous dynamic mixing of the components at a temperature between 180° C. and 280° C., until formation of the alkyd resin.

15. The preparation method according to claim 14, wherein the polycondensation step is carried out without a catalyst for esterification.

16. The preparation method according to claim 14, wherein the temperature of a reaction medium of the components during the polycondensation step is at least 180° C., under a flow of chemically inert gas.

17. The preparation method according to claim 14, wherein the temperature of a reaction medium of the components during the polycondensation step is maintained for at least two hours between 220° C. and 250° C. until an acid number of less than 20 mg KOH/g of the alkyd resin is attained.

18. A paint comprising the resin according to claim 1.

19. A composition comprising a coating selected from coatings for adhesives, paints, wood stains, primary coats or varnishes, wherein the composition comprises the resin according to claim 1.

20. The resin according to claim 1, wherein the at least one polyacid or acid anhydride thereof comprises succinic acid or succinic acid anhydride and one or more of adipic acid, adipic acid anhydride, itaconic acid, itaconic acid anhydride, azelaic acid, azelaic acid anhydride, sebacic acid, sebacic acid anhydride, tartaric acid, tartaric acid anhydride, citric acid, citric acid anhydride, malic acid, or malic acid anhydride.

21. The resin according to claim 1, wherein the at least one polyacid further comprises a dimer of a fatty acid of plant origin, a trimer of a fatty acid of plant origin, a dimer of a fatty acid of animal origin, or a trimer of a fatty acid of animal origin.

22. The resin according to claim 1, wherein the resin results from the polycondensation:
- of succinic acid or succinic acid anhydride;
- of soya oil or soya fatty acid;
- of isosorbide; and
- of Portuguese gem rosin.

23. An alkyd resin resulting from the polycondensation of:
- succinic acid or succinic acid anhydride;
- at least one oil or corresponding fatty acid, wherein the at least one oil comprises soya oil, sunflower oil, flax oil, tung oil, castor oil, tall oil, or a mixture thereof;
- 1,4:3,6-dianhydro-D-sorbitol (isosorbide), 1,4:3,6-dianhydro-D-mannitol (isomannide), or 1,4:3,6-dianhydro-L-iditol (isoidide); and
- Portuguese gem rosin or a rosin derivative chosen from abietic acid or dehydroabietic acid;
- wherein the Portuguese gem rosin or rosin derivative comprises from about 10% to about 80% by dry weight of the total of succinic acid or succinic acid anhydride and Portuguese gem rosin or rosin derivative.

* * * * *